(12) United States Patent
Usov

(10) Patent No.: US 7,487,495 B2
(45) Date of Patent: Feb. 3, 2009

(54) GENERIC FRAMEWORK FOR RUNTIME INTERCEPTION AND EXECUTION CONTROL OF INTERPRETED LANGUAGES

(75) Inventor: Viacheslav Usov, Strassen (LU)

(73) Assignee: Lumension Security, Inc., Scottsdale, AZ (US)

( * ) Notice: Subject to any disclaimer, the term of this patent is extended or adjusted under 35 U.S.C. 154(b) by 514 days.

(21) Appl. No.: 11/107,907

(22) Filed: Apr. 18, 2005

(65) Prior Publication Data

US 2005/0246683 A1    Nov. 3, 2005

Related U.S. Application Data

(60) Provisional application No. 60/562,983, filed on Apr. 19, 2004, provisional application No. 60/562,982, filed on Apr. 19, 2004, provisional application No. 60/564,579, filed on Apr. 23, 2004.

(51) Int. Cl.
  *G06F 9/45* (2006.01)
  *G06F 9/44* (2006.01)
(52) U.S. Cl. .............. 717/139; 717/136; 717/114; 717/115; 717/116; 717/118
(58) Field of Classification Search .............. 717/139, 717/136, 114, 115, 116, 118, 127, 177; 713/185, 713/182
See application file for complete search history.

(56) References Cited

U.S. PATENT DOCUMENTS

| | | | | |
|---|---|---|---|---|
| 5,794,049 A | * | 8/1998 | Lindholm | 717/136 |
| 5,826,088 A | * | 10/1998 | Sitbon et al. | 717/139 |
| 5,854,930 A | * | 12/1998 | McLain et al. | 717/139 |
| 5,923,878 A | * | 7/1999 | Marsland | 717/139 |
| 6,038,394 A | * | 3/2000 | Layes et al. | 717/139 |
| 6,094,528 A | * | 7/2000 | Jordan | 717/115 |
| 6,141,793 A | * | 10/2000 | Bryant et al. | 717/139 |
| 6,473,893 B1 | * | 10/2002 | Kay et al. | 717/116 |
| 6,721,941 B1 | * | 4/2004 | Morshed et al. | 717/127 |
| 6,766,454 B1 | * | 7/2004 | Riggins | 713/185 |
| 6,996,814 B2 | * | 2/2006 | Bak | 717/118 |
| 2002/0099952 A1 | * | 7/2002 | Lambert et al. | 713/200 |

(Continued)

OTHER PUBLICATIONS

Karinthi, et al. "Incremental Re-Execution of Programs", 1987, ACM, p. 38-44.*

(Continued)

*Primary Examiner*—Wei Y Zhen
*Assistant Examiner*—Qamrun Nahar
(74) *Attorney, Agent, or Firm*—Greenberg Traurig, LLP

(57) ABSTRACT

A system and method for controlling execution of an interpreted language. Statements of the interpreted language to be executed by a script engine are intercepted by a protection module and control is passed to a script helper module that is asociated with the script engine. The script helper module establishes a secure communications channel with an authorization component and passes the statements and an authorization request to the authorization component. The authorization component sends a reply to the script helper module which either permits the script engine to execute the statement or cancels the attempted execution. When the script engine is loaded, a list is updated identifying the script engine. If a script helper module is not present for the loaded script engine, a boot-strap loader is called to load the script helper module. A special information block contains data as to the location of the interception points.

9 Claims, 7 Drawing Sheets

U.S. PATENT DOCUMENTS

2003/0204842 A1* 10/2003 Chenelle et al. ............. 717/177

OTHER PUBLICATIONS

Milanes, et al. "Managing jobs with an interpreted language for dynamic adaptation", 2005, ACM, p. 1-6.*

Kc, et al. "Countering Code-Injection Attacks with Instruction-Set Randomization", 2003, ACM, p. 272-280.*

Hawkins, W. "LIMP: An Interpreted Programming Language for Students, Professors and Programmers", 2003, CCSC, p. 96-109.*

International Search Report and Written Opinion (Ten (10) pages) dated Feb. 8, 2006.

* cited by examiner

GENERIC FRAMEWORK FOR RUNTIME INTERCEPTION AND EXECUTION CONTROL OF INTERPRETED LANGUAGES

CROSS-REFERENCE TO RELATED APPLICATIONS

This application is related to and claims priority to U.S. Provisional Application, Ser. No. 60/562,983, filed Apr. 19, 2004, and titled "A GENERIC FRAMEWORK FOR RUNTIME INTERCEPTION AND EXECUTION CONTROL OF INTERPRETED LANGUAGES", which application incorporated by reference into the instant application.

This application is related to U.S. Provisional Application 60/562,982, filed Apr. 19, 2004, and titled "ONLINE CENTRALIZED AND LOCAL AUTHORIZATION OF EXECUTABLE FILES", which application is incorporated by reference into the instant application.

This application is related to U.S. Provisional Application 60/564,579, filed Apr. 23, 2004, titled "TRANSPARENT ENCRYPTION AND ACCESS CONTROL FOR MASS STORAGE DEVICES", which application is incorporated by reference into the instant application.

FIELD OF THE INVENTION

The present invention relates generally to the execution of interpreted code and more particularly to a security system that controls whether or not the interpreted code is allowed to be executed.

DESCRIPTION OF THE RELATED ART

Cryptographic digests, public and symmetric key cryptography, and digital certificates are used extensively in order to identify executables and secure communication links between the configuration store and the protection module. A number of algorithms (SHA-1 for digests and certificates, RSA public key cryptography for certificates and secure communications, AES for secure communications) are in public domain and are employed by the system.

A technique for intercepting system services on the MS Windows NT family of operating systems involves overwriting ("patching") the system service table. The technique is in public domain.

The prior art also includes ad hoc techniques that intercept a number of known applications that use an interpreted language. They may not be able to handle interpreted languages when their target applications undergo a version change, and they are not able to handle the same interpreted language in all applications. Other systems may use less-secure interception methods.

BRIEF SUMMARY OF THE INVENTION

There are multiple competing systems able to intercept certain interpreted languages in certain applications. None, however, intercepts interpreted languages generically. None is known to identify code for a white-list procedure.

The present invention provides a generic way to intercept script engines, which is the entity responsible for execution of an interpreted language. A particular script engine is intercepted in all cases of its invocation, without employing ad hoc techniques based on the users of the engine. Supported by a white-list system, this technique ensures that all known scrip engines are always intercepted, while no unknown script engines are allowed by the white-list system.

The present invention provides for a system that is easily extensible; all language specific code logic is contained in the script engine handler module and the IDD.

The cryptographic digests (or other identity algorithms) used by the present invention let the users (or administrators) configure the system so that known-safe interpreted language code is authorized without interrupting a user's activities, while known-unsafe (and frequently encountered) code is silently denied. Identity algorithms include text metrics which are a numerical measure of the similarity between two texts. For example, texts that differ only in the number of blanks may be defined to be identical, with a distance metric of zero. Texts that differ in the number of blanks and letter case may be defined to have a distance metric of 1. Other distance definitions are possible, such as the distance being the sum of all dissimilar words and the number of permutations of all of the similar words. Text metric algorithms are important for interpreted languages (scripts) because scripts are generated by persons, not machines, and such differences as the number of blanks and letter case may be insignificant.

An embodiment of the present invention is a method for controlling execution of an interpreted language. The method includes the steps of (i) determining that statements of the interpreted language are attempting execution or there is an invocation request to execute said statements, (ii) intercepting the statements or invocation request and passing control to a script helper module associated with a script engine that interprets statements of the language, if the script helper module is present, (iii) establishing a secure communications channel with an authorization component, (iv) sending the interpreted language code over the channel with information regarding the origin of the code, (v) receiving a reply from the authorization component, (vi) passing the original code or invocation request to the script engine, if execution of the code is permitted, and (vii) canceling the attempting execution of invocation request, if execution is not permitted.

Another embodiment of the present invention is a system for controlling execution of an interpreted language. The system includes an authorization component, one or more script engine helper modules, a configuration provider, an administrative console, and a protection module. The authorization component is configured to manage a database list of permanently authorized or denied identities of language code to be executed and to receive an authorization request and derive a unique identity value for language code having said authorization request. The authorization component is further configured to compare the unique identity value with the list and to generate a reply to the authorization request. The script engine helper modules are configured to establish a communication channel to the authorization component, to transmit the language code to be executed to the authorization component, and to make an authorization request. The configuration provider is configured to store authorization modes in the authorization component. The administrative console is operative for use in viewing an modifying configuration settings of the authorization component and the protection module is configured to intercept services provided by an operating system for executing executable files based on information in an information block.

An object of the invention is to control execution of interpreted code. The protection system may be configured by system administrators to allow or disallow an interpreted language, or to function in a "pass-through" mode (see below), for all interpreted languages (known to the system) or on a per language basis. The invention extends the security framework of contemporary computer operating systems and relies on the operating system to provide system services to load and/or execute standalone executable modules. The invention interacts with the operating system's vendor-supplied or third-party modules that enable applications to use interpreted languages.

When in the "pass-through" mode, the decision to execute a particular interpreted program (script or macro) is delegated to user, and, optionally, is recorded and then automatically applied to the same program in subsequent invocations.

The privileged protection module ensures that a script engine is always handled by a script engine helper module.

The use of cryptographic digests and text metric algorithms enables the users and administrators to identify safe and unsafe interpreted language code and handle it accordingly, without disturbing the user. This also allows a purely white-list list procedure, where only known-safe code is allowed and everything else is denied.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1A:
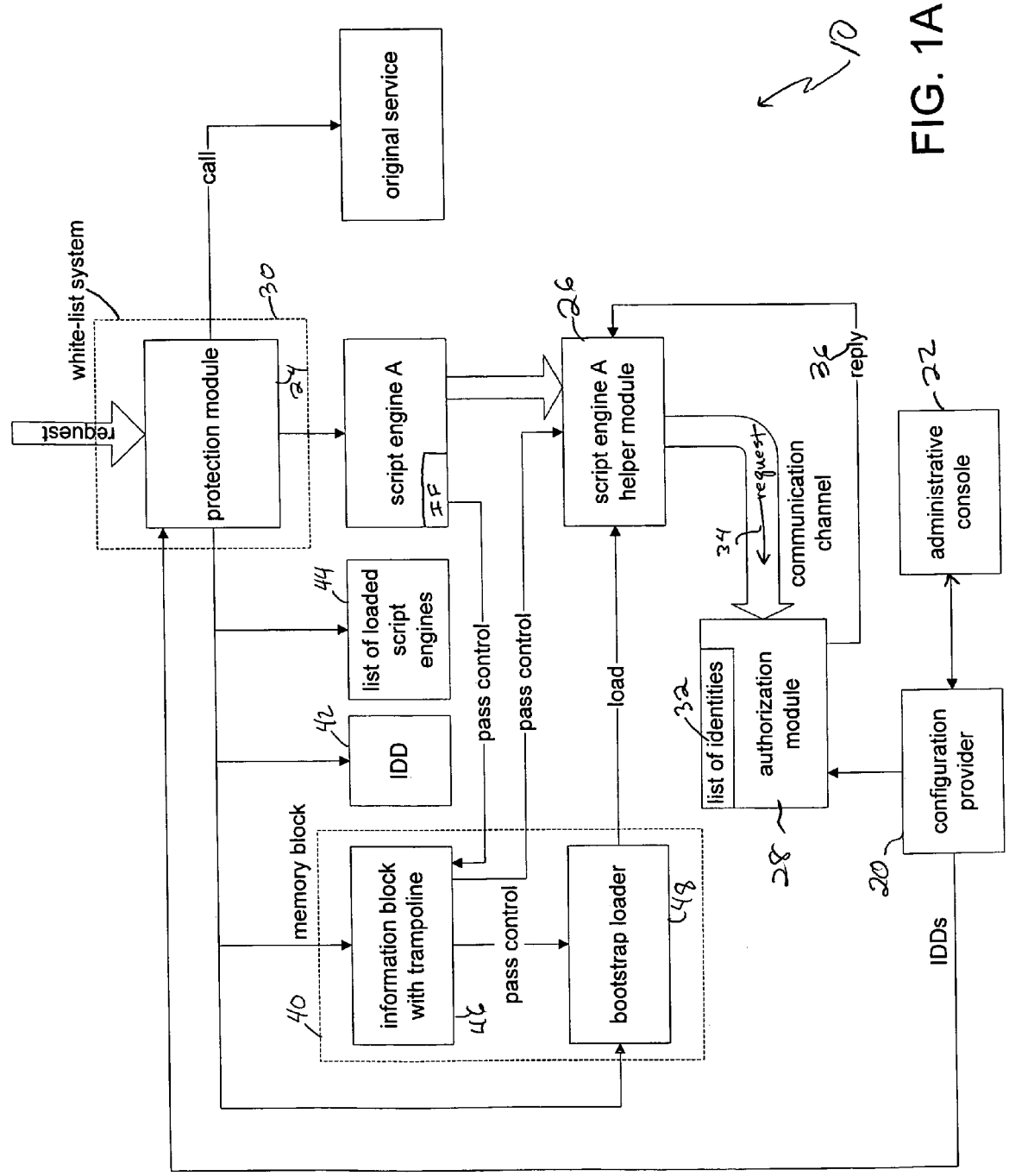
FIG. 1A is a system diagram of the present invention.
Figure 1B:
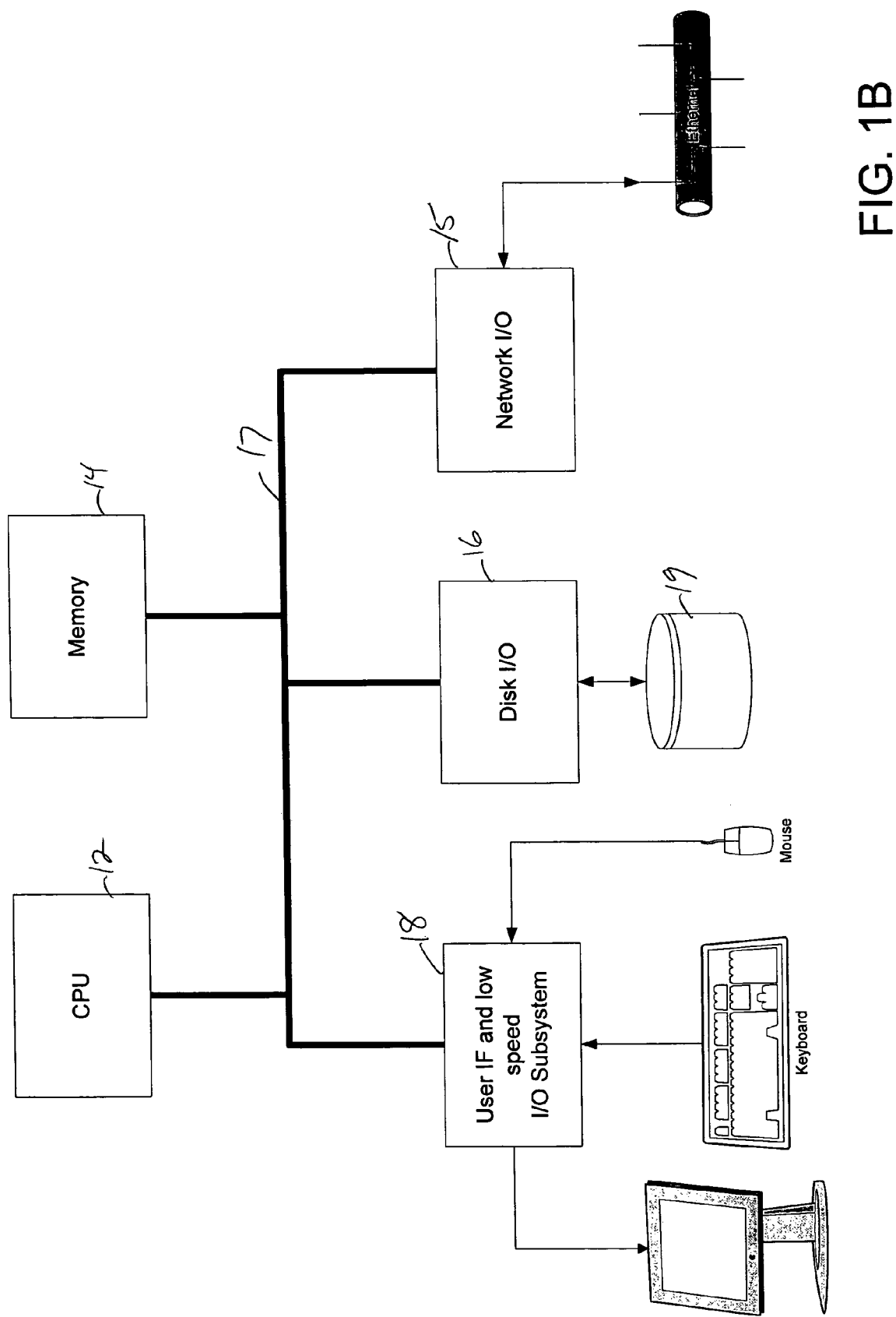
FIG. 1B is a diagram of a typical computer system.

Referring to the system diagram of FIG. 1A, five standalone software components are included in the system 10: a configuration provider 20, an administrative console 22, a protection module 24, one or more script engine helper modules 26, and an authorization module 28. A white-list system 30 may optionally be present. The software components execute on an exemplary computer system, shown in FIG. 1B, that includes a processor 12, a memory 14, a mass storage subsystem 16, 19, a network subsystem 15, and user-oriented I/O 18, interconnected by a bus 17. The memory 14 and/or mass storage system 16, 19 store the instructions of the software components used for execution by the processor 12.

The configuration provider 20 is a means for storing the mode of the authorization module for users and security groups. The configuration provider may be provided by an operating system or by a standalone system.

The administrative console 22 is a set of instruments that the system administrators use to view and modify the configuration settings of the authorization module 28. If an IDD is allowed to be modified online, the administrative console 22 provides certain means for carrying that out.

The protection module 30 is a highly privileged module installed at the computers being protected. This module 30 intercepts the services that the operating system provides to load and execute executable files. When a service is intercepted, the module 30 matches the module against a set of IDDs, and if a match is found, intercepts it. The protection module may be, in fact, a task within the white-list system's protection module 30. The protection module interacts with a memory block, the IDDs 42, and a list 44 of loaded script engines. The memory block includes a information block 46 and a bootstrap loader 48.

Each script engine helper module 26 possesses intimate knowledge of the script engine it handles and interacts with the authorization module to determine whether code is authorized to be executed.

The authorization module 28 interacts with a database list of permanently authorized or denied identities 32 of language code to be executed. It receives an authorization request 34 and derives a unique identity value for language code associated with the authorization request. The authorization component compares the unique identity value with the list and generates a reply 36 to the authorization request.

Figure 2A:
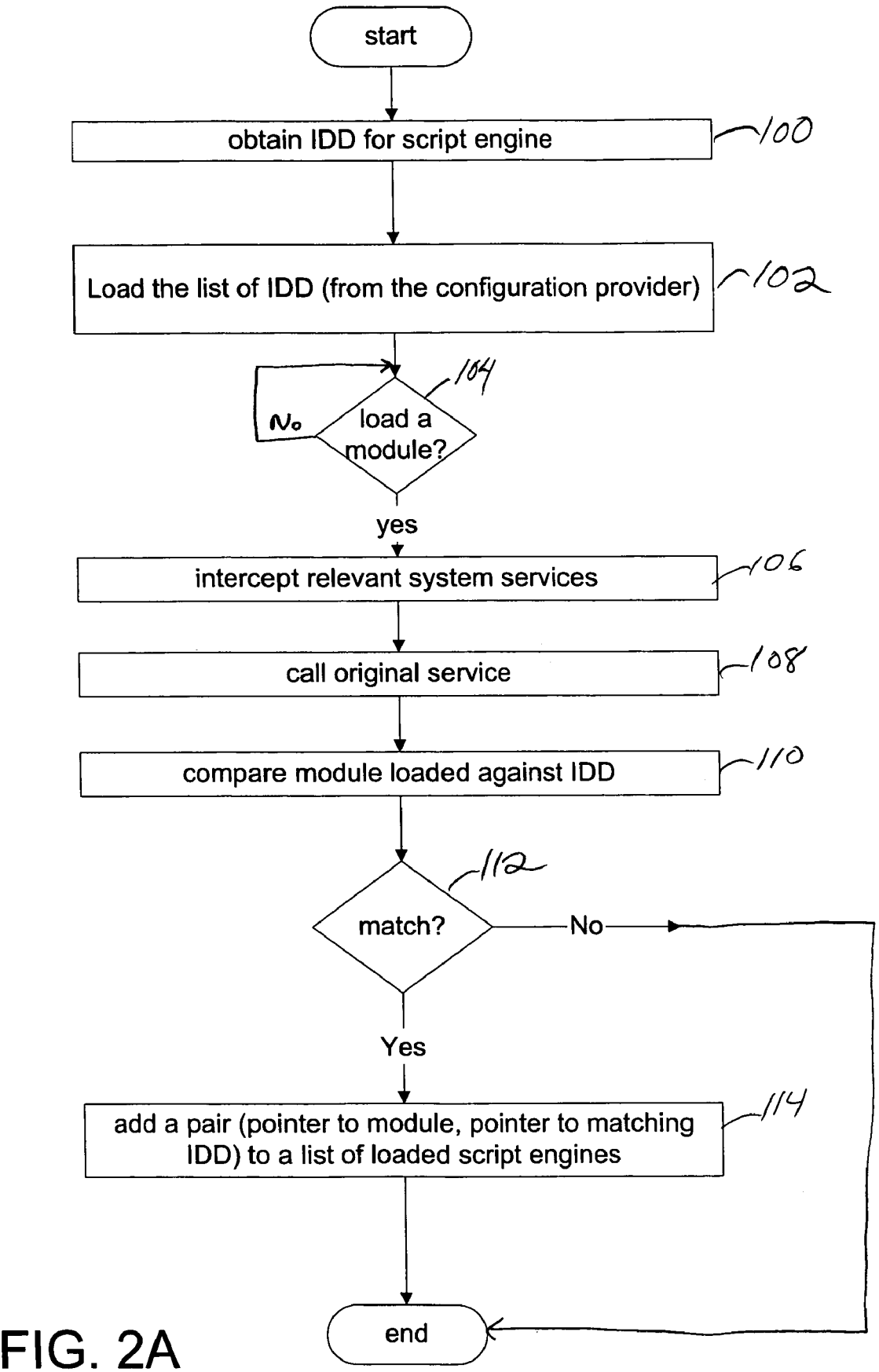
FIGS. 2A-2E are flow charts showing a method in accordance with an embodiment of the present invention.
Figure 2B:
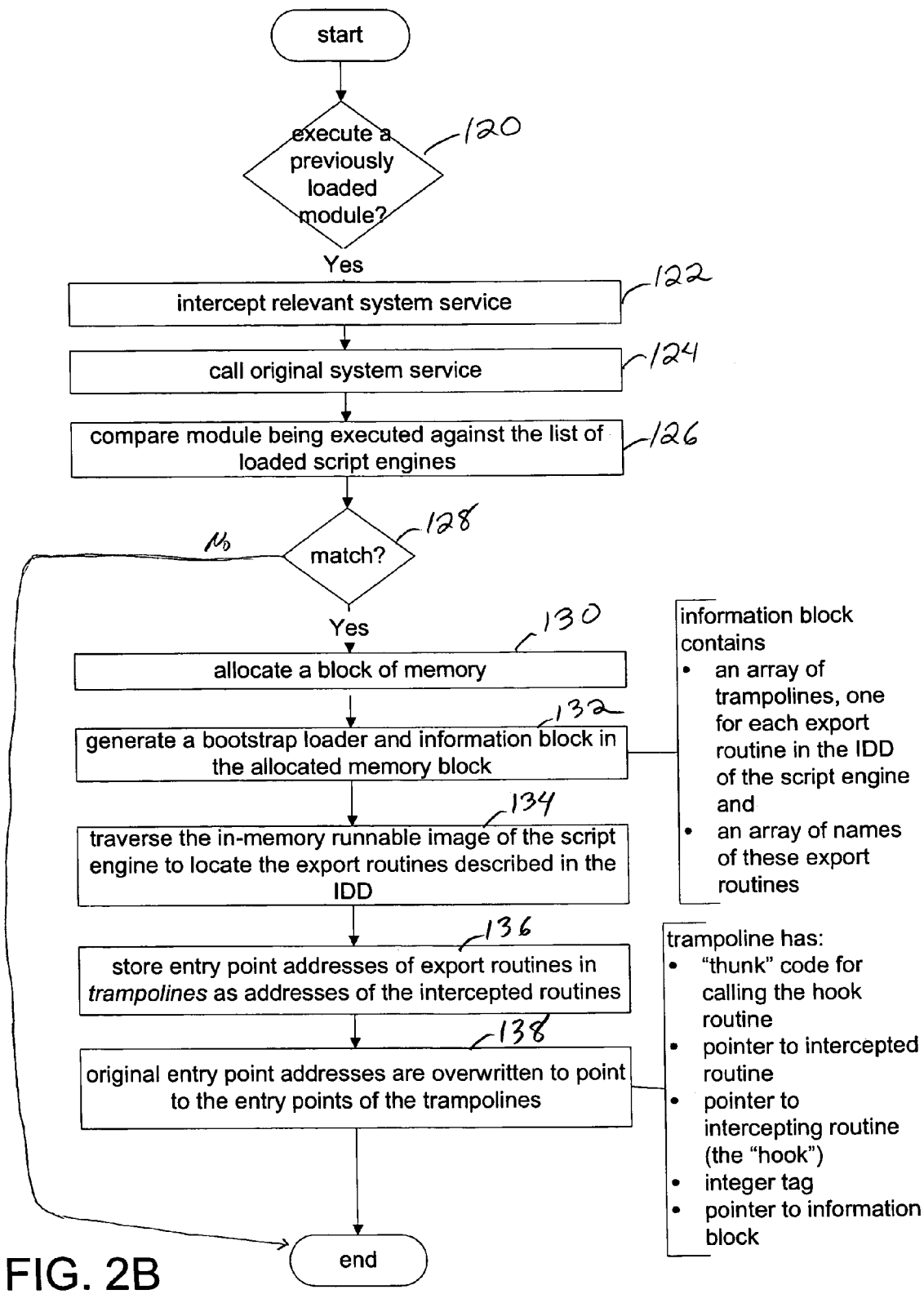

There are four major tasks to be performed in a process in accordance with an embodiment of the present invention. The first major task, performed by the protection module, is the identification of a script engine and the injection of interception code and data into the process loading the script engine. This is illustrated in FIGS. 2A and 2B. For the Windows NT family of operating system, this involves intercepting two different system services, create section and map section.

Figure 2C:
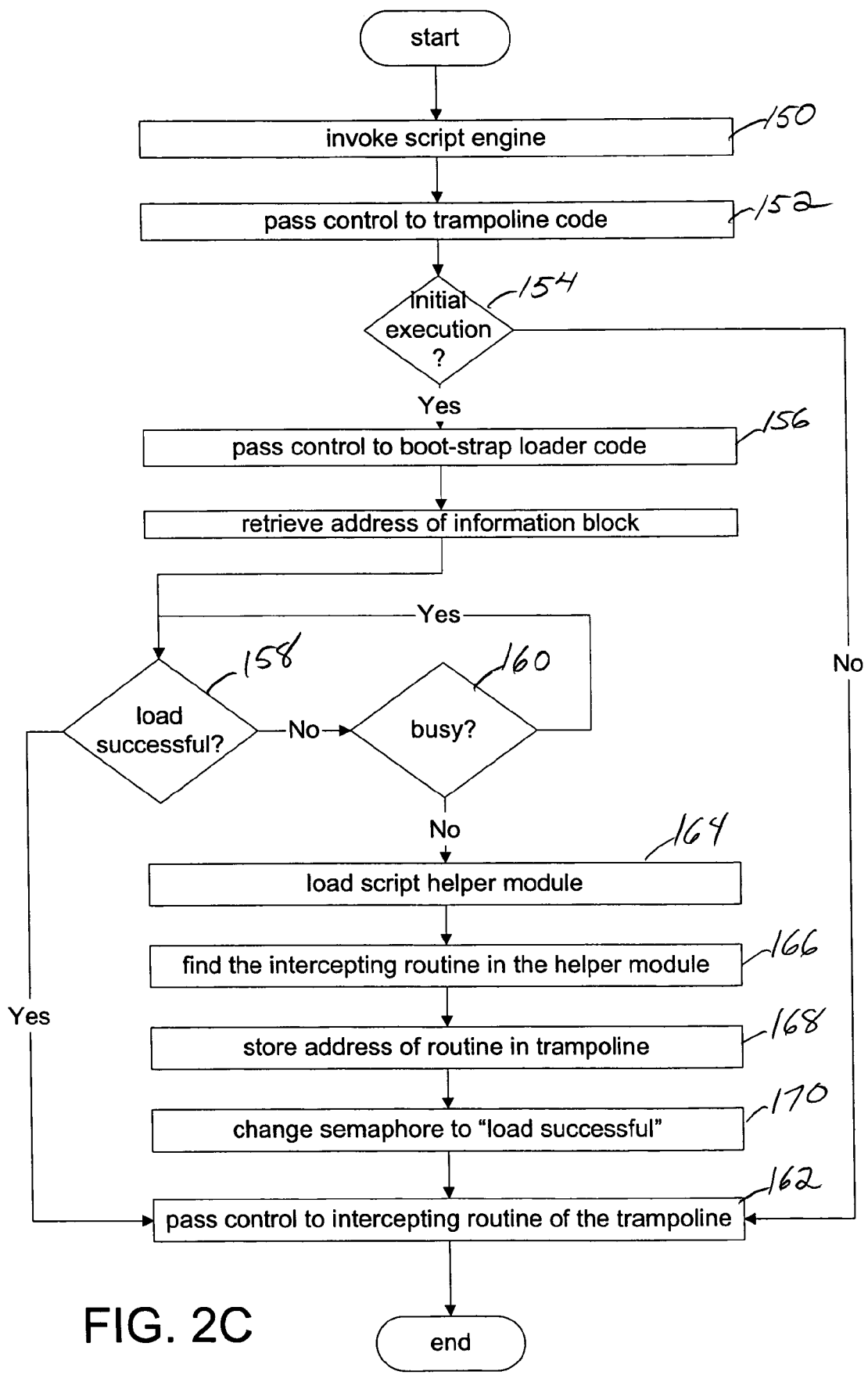

The second major task, which is performed by the injected trampolines and the bootstrap loader, is the interception of the script engine interface and the loading of the script helper during the first intercepted call. This is illustrated in FIG. 2C. In this task, a bootstrap sequence is commenced, a script helper is loaded and then called.

Figure 2D:
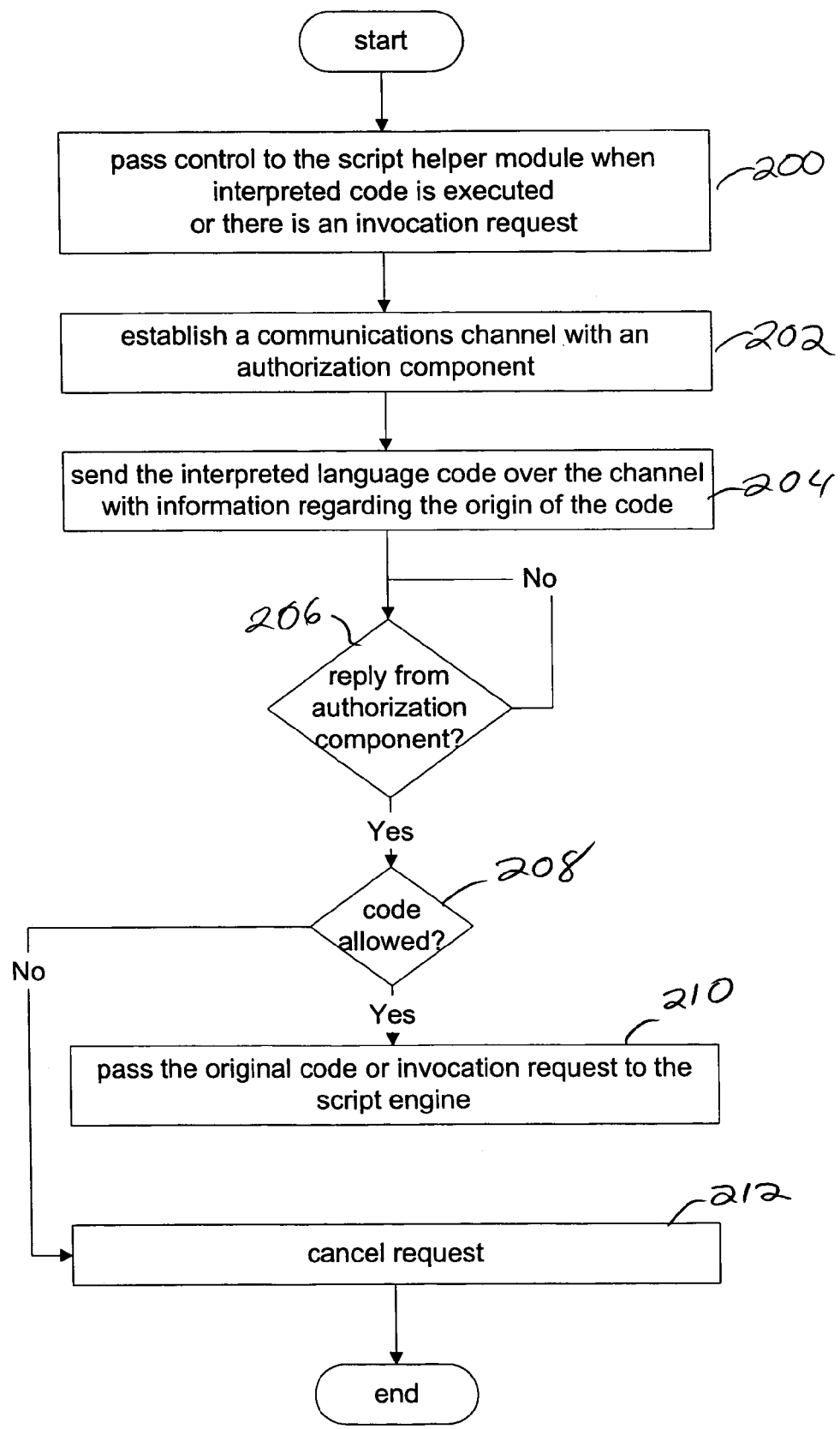

In the third major task, shown in FIG. 2D, the language specific (or script engine-specific) interception occurs.

Figure 2E:
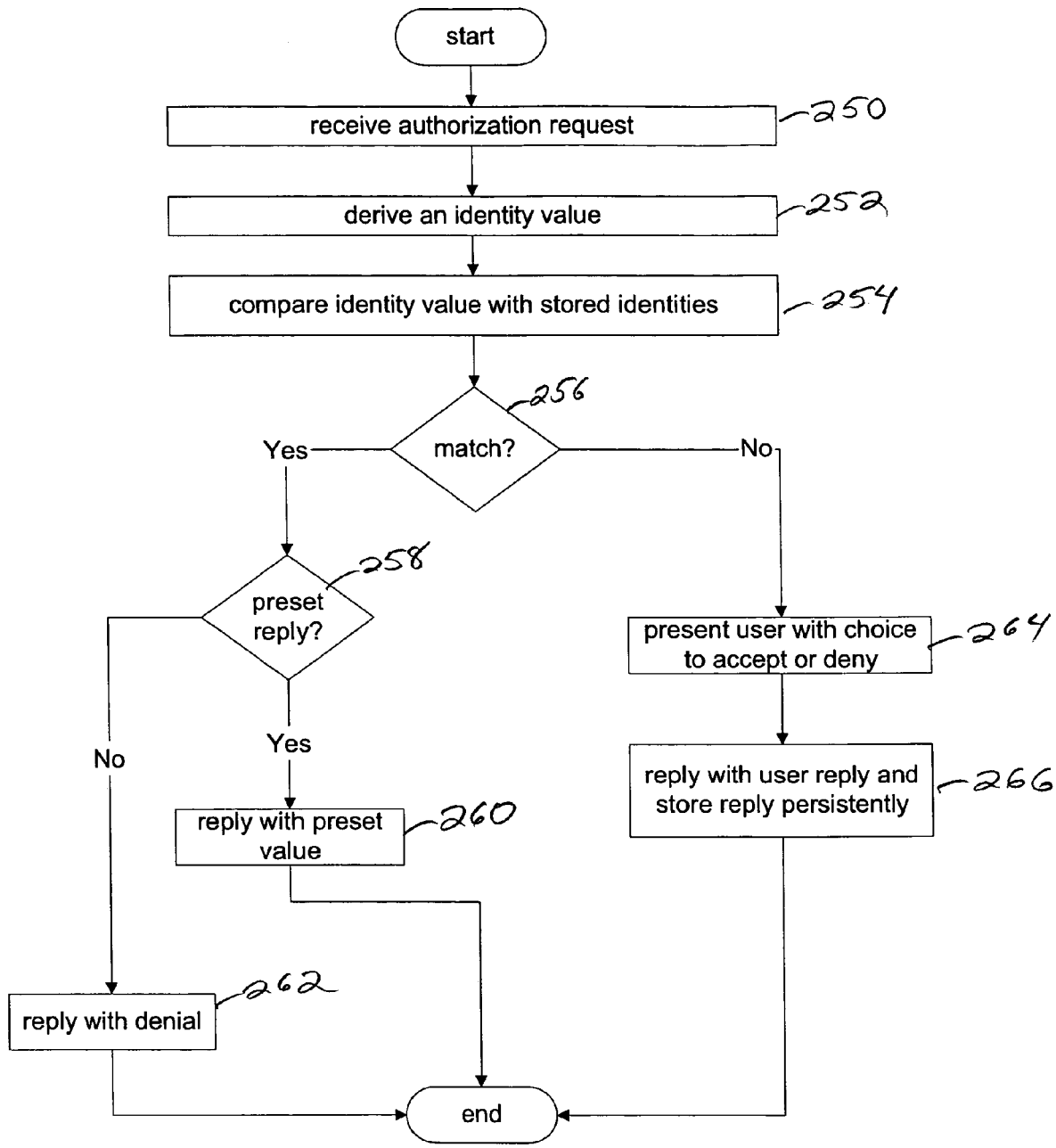

The fourth major task, illustrated in FIGS. 2D and 2E and performed by the authorization module, is the checking and authorization of intercepted scripts.

Referring to FIG. 2A, the intercept of script engines is described in more detail. To intercept a script engine, it must be identifiable and known to the protection system. Script engines may be identified by their file names, filesystem or network location, or their cryptographic digests, via the script engine registration information (if supported by the operating system). There are also certain descriptive data associated with each script engine. Thus, each script engine is associated with certain Identification and Description Data (IDD). In step 100, the IDD for a script engine is obtained and the list of IDDs is loaded, in step 102. The IDD may be hardcoded or changeable. For each script engine, the IDD contains a location or image of a script engine helper module and a list of export routines that must be intercepted. When an attempt to load a module (create a section object for the Windows NT family of operation systems) takes place in step 104, the relevant system services are intercepted in step 106, by the privileged protection module, which then calls, in step 108, the original service and matches, in step 110, the module being loaded against the IDD. If a match is found, as determined in step 112, a pointer to the module and a pointer to its IDD are added, in step 114, to a list of loaded script engines. If there is no match found in step 112, the module being loaded is not a known script engine. In this case, the protection module simply returns control.

Referring to FIG. 2B, when an attempt to execute a previously loaded module (map a section object for the Windows NT family of operating systems) takes place as determined in step 120, the relevant system service is intercepted, in step 122, by the privileged protection module, which then calls, in step 124, the original service, and matches, in step 126, the module being executed against the list of loaded script engines. If a match is found as determined in step 128, a block of memory is allocated, in step 130, in the process executing the script engine, a boot-strap loader and information block is generated, in step 132, in the allocated block, the in-memory runnable (mapped) image of the script engine is traversed and the export routines described in the IDD are located, in step 134. The entry point addresses of the export routines are then stored, in step 136, in the trampolines as addresses of the intercepted routines and the original export entry point addresses are then overwritten, in step 138, to point to the entry points of the trampolines. This ensures that, whenever an intercepted export routine is called, control is diverted to an associated trampoline. The information block that was generated contains an array of trampoline structures, one for each export routine in the IDD of the script engine, and an array of the names of these export routines. Each trampoline structure includes five fields, (i) a "thunk" code, which calls a "hook" routine, passing itself as an additional parameter, (ii) an address field for pointing to the "original" (intercepted) routine, (iii) an address field for pointing to the "hook" (intercepting routine), (iv) an integer "tag" field, and (v) an address field for pointing to the boot-strap information block. The pointer to the "hook" initially points to the bootstrap code and then to the corresponding routine in the script helper. Each trampoline also contains a short sequence of executable code (see below).

Referring to FIG. 2C, when the script engine is invoked, in step 150, through an intercepted export routine, the trampoline receives control, in step 152. The trampoline code retrieves the address of the trampoline and then transfers control at the address of the intercepting routine, passing the address of the trampoline as a parameter (the parameters that may have been specified by the caller of the export routine are preserved as well). Initially, all the trampolines have the address of the boot-strap loader as the address of the intercepting routine, thus the boot-strap loader receives control, in step 156. The boot-strap loader retrieves the address of the information block, in step 158, and performs an atomic compare-exchange on a semaphore variable stored in the block. If the semaphore signals that the boot-strap loader has executed successfully, as determined in step 158, the loader simply transfers control, in step 162, to the intercepting routine of the trampoline (the address of which is passed as a parameter). If the semaphore signals that the boot-strap loader is executing (in another thread), as determined in step 158, it performs a (busy) wait on the semaphore, in step 160, until the semaphore signals a successful load, as determined in step 158, and transfers control to the intercepting routine of the trampoline, in step 162. Otherwise, if the semaphore signals that a load has not been attempted yet, as determined in step 160, it starts the load sequence.

Continuing with FIG. 2C, the load sequence proceeds as follows. The script engine helper module, whose location or image is contained in the bootstrap information block, is loaded in step 164. For each intercepted export routine, an intercepting routine in the script engine helper module is found, in step 166, and its address is stored, in step 168, as the address of the intercepting routine in the trampoline. The semaphore is set to a "load successful" state, in step 170, and execution is transferred, in step 162, to the intercepting routine of the trampoline that was passed as a parameter to the boot-strap loader.

Script Engine Helper Execution

Each script engine helper module possesses intimate knowledge of the script engine it handles. Both execute within the same process; thus, the helper module may easily use a host of well-known "hooking" and "patching" techniques. Typically, the number of the export routines in the IDD (intercepted before the helper module loads) is small. They are normally the routines that are executed by the script engine user to initialize the script engine and/or retrieve a programming interface relating to the functionality of the script engine. The other routines that must be intercepted are intercepted by the helper module when the IDD-intercepted routines execute. This keeps the IDD small and the script engine interception logic localized in the helper module.

Referring now to FIG. 2D, eventually, a script engine helper module intercepts, in step 200, an interpreted language code (script or macro) load or invocation request. At this stage, the helper module has access to the interpreted language code. The helper module establishes a communication channel, in step 202, with an authorization component, sends the interpreted language code over the channel, in step 204, together with information on the origin of the code (the application that has loaded the code, the filesystem or network location the code has been loaded from, etc.) and awaits a reply, in step 206, from the authorization component. The reply either allows or denies the execution of the code. If the code is allowed, as determined in step 208, the script engine helper module passes the original load or invocation request, in step 210, to the script engine, or otherwise cancels the request, in step 212, in an appropriate way.

Authorization Module

Referring to FIG. 2E, the authorization module may be a system of interacting modules. In the simplest case, it is a user-mode application executing in the context of the same user. If the authorization module is in the allow-all or deny-all mode for the user, the request is responded to accordingly. When interpreted code is received as a part of an authorization request in step 250, the code may be used to derive, in step 252, a cryptographic digest, or some other identity value (e.g., by algorithms that measure textual proximity). This identity value is compared, in step 254, with the list of permanently authorized or denied identities, which is stored persistently by the authorization module. If a match is found (or the code is evaluated as similar by text-metric algorithms), as determined in step 256, and if a preset reply is found, as determined in step 258, the preset reply is retrieved from the persistent data, in step 260. If no preset reply is found, as determined in step 258, and the authorization module is not in the ask-user mode, a negative reply is sent, in step 262. Otherwise, the code and the information on the code are shown to the user, in step 264, which is the pass-through mode. The user determines whether the code is do be allowed or denied, in step 266. The user may also specify that the reply be associated persistently with the identity of the code (whereupon the identity and the reply are stored permanently).

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for controlling the execution of a statement of interpreted computer language code, the method comprising the steps of:

determining that a statement of computer language code is attempting execution or that there is an invocation request to execute a statement of computer language code;

intercepting the statement or invocation request prior to execution of the computer language code;

passing control to a script helper module associated with a script engine able to interpret the statement of computer language code if a script helper module is present;

passing control to a boot-strap loader if a script helper module is not present, retrieving an address of an information block (IDD) associated with a script engine able to interpret the statement of computer language code, wherein the information block identifies a script helper module associated with the script engine, and loading the script helper module identified in the information block;

accessing the interpreted language code using the script helper module;

identifying origin information relating to the statement of computer language code;

establishing a secure communications channel with an authorization component;

sending the interpreted language code over the channel with the identified origin information;

receiving a reply from the authorization component;

passing the original statement of computer language code or invocation request to the script engine, if execution thereof is permitted; and canceling the attempting execution of invocation request, if execution of the code is not permitted.

2. A method for controlling execution of a statement of interpreted computer language code as recited in claim 1, wherein the information block (IDD) identifies a list of routines that must be intercepted.

3. A method for controlling execution of a statement of interpreted computer language code as recited in claim 2, further comprising, prior to passing control to the boot-strap loader if a script helper module is not present, passing control to a trampoline structure that invokes the boot-strap loader, wherein the trampoline structure includes an address of a boot-strap block and a short sequence of code, wherein passing control to the trampoline structure includes executing the short sequence of code in the trampoline structure.

4. A method for controlling execution of a statement of interpreted computer language code as recited in claim 1, further comprising, prior to the step of determining that a statement of computer language code is attempting execution or that there is an invocation request to execute a statement of computer language code, loading the script engine that is able to interpret the statement of computer language code.

5. A method for controlling execution of a statement of interpreted computer language code as recited in claim 4, wherein the step of loading a script engine that is able to interpret the statement of computer language code further includes:

obtaining an IDD for the script engine that interprets the statement of the computer language code;

obtaining a list of export routines that must be intercepted and a location of the script helper module from the IDD; and adding a pointer from the script engine and adding its IDD to a list of loaded script engines.

6. A method for controlling execution of a statement of interpreted computer language code as recited in claim 1, further comprising, prior to the step of intercepting the statement or invocation request prior to execution of the computer language code, setting up an intercept structure.

7. A method for controlling execution of a statement of interpreted computer language code as recited in claim 6, wherein the step of setting up the intercept structure includes:

traversing an in-memory runnable image of the script engine to locate one or more routines described in its IDD that must be intercepted;

storing one or more entry point addresses of the one or more routines that must be intercepted in a trampoline structure; and overwriting the one or more original entry point addresses in the script engine to be the one or more entry points of the trampoline structure, wherein the trampoline structure includes the address of the intercepted routine, the address of the intercepting routine, an address of a boot-strap block, an integer tag and a short sequence of code.

8. A method for controlling execution as recited in claim 1, wherein the reply from the authorization component is either a preset reply if there is match between a set of stored identities and the intercepted language statements and said preset reply exists or is a user reply in response to a query sent to a user.

9. A method for controlling execution as recited in claim 8, wherein the reply is a denial of permission if there is match, but no preset reply.

* * * * *